(12) United States Patent
John

(10) Patent No.: US 11,876,894 B2
(45) Date of Patent: Jan. 16, 2024

(54) METHOD FOR CONTROLLING DISTRIBUTION OF A PRODUCT IN A COMPUTER NETWORK AND SYSTEM

(71) Applicant: Roche Diabetes Care, Inc., Indianapolis, IN (US)

(72) Inventor: Christoph John, Bensheim (DE)

(73) Assignee: Roche Diabetes Care, Inc., Indianapolis, IN (US)

(*) Notice: Subject to any disclaimer, the term of this patent is extended or adjusted under 35 U.S.C. 154(b) by 0 days.

(21) Appl. No.: 18/061,291

(22) Filed: Dec. 2, 2022

(65) Prior Publication Data

US 2023/0116297 A1    Apr. 13, 2023

Related U.S. Application Data

(63) Continuation of application No. 16/945,527, filed on Jul. 31, 2020, now Pat. No. 11,533,166, which is a (Continued)

(51) Int. Cl.
*H04L 29/06* (2006.01)
*H04L 9/08* (2006.01)
(Continued)

(52) U.S. Cl.
CPC ........ *H04L 9/0819* (2013.01); *G06F 16/2379* (2019.01); *G06K 1/121* (2013.01);
(Continued)

(58) Field of Classification Search
None
See application file for complete search history.

(56) References Cited

U.S. PATENT DOCUMENTS

| | | |
|---|---|---|
| 2015/0269570 A1 | 9/2015 | Phan et al. |
| 2016/0253622 A1 | 9/2016 | Sriram et al. |
| 2017/0046664 A1 | 2/2017 | Haldenby et al. |

FOREIGN PATENT DOCUMENTS

| | | |
|---|---|---|
| CN | 105976232 A | 9/2016 |
| CN | 107431622 A | 12/2017 |

(Continued)

OTHER PUBLICATIONS

International Search Report and Written Opinion of the International Searching Authority, PCT/EP2019/052544, dated Apr. 5, 2019, 12 pages.

(Continued)

*Primary Examiner* — Andrew J Steinle
(74) *Attorney, Agent, or Firm* — Bose McKinney & Evans LLP

(57) ABSTRACT

A system and method for controlling recall of a product in a computer network. A pair of product keys can be assigned to the product including a private product key and a public product key. A pair of product recall keys can be assigned to a product recall, including a private product recall key and a public product recall key. A data processing device assigned to a manufacturer in the computer network can be configured to print a matrix code on the product and generate a recall transaction assigned to the product indicating a recall request for the product. The data processing device can sign the recall transaction with the private product recall key and a private manufacturer key. A second data processing device is configured to scan the printed matrix code on the product and provide the public product recall key by decrypting the printed matrix code.

18 Claims, 10 Drawing Sheets

Related U.S. Application Data continuation of application No. PCT/EP2019/052544, filed on Feb. 1, 2019.

(51) Int. Cl.
    *G06F 16/23*     (2019.01)
    *G06K 1/12*     (2006.01)
    *G06K 7/14*     (2006.01)
    *G06Q 30/018*     (2023.01)
    *H04L 9/06*     (2006.01)
    *H04L 9/30*     (2006.01)
    *H04L 9/00*     (2022.01)

(52) U.S. Cl.
    CPC ......... *G06K 7/1417* (2013.01); *G06Q 30/018* (2013.01); *H04L 9/0637* (2013.01); *H04L 9/3073* (2013.01); *H04L 9/50* (2022.05)

(56) References Cited

FOREIGN PATENT DOCUMENTS

| | | | |
|---|---|---|---|
| WO | WO 2016/138447 A1 | 9/2016 | |
| WO | WO-2016138447 A1 * | 9/2016 | ......... G06Q 10/0833 |
| WO | WO 2017/027648 A1 | 2/2017 | |
| WO | WO-2017027648 A1 * | 2/2017 | ............. G06Q 10/08 |
| WO | WO 2017/165909 A1 | 10/2017 | |
| WO | WO-2017165909 A1 * | 10/2017 | ....... G06K 19/07758 |

OTHER PUBLICATIONS

Abeyratne et al., Blockchain Ready Manufacturing Supply Chain Using Distributed Ledger, International Journal of Research in Engineering and Technology, Sep. 2016, vol. 5, Issue 9, 10 pages.

\* cited by examiner

METHOD FOR CONTROLLING DISTRIBUTION OF A PRODUCT IN A COMPUTER NETWORK AND SYSTEM

RELATED APPLICATIONS

This application is a continuation of U.S. patent application Ser. No. 16/945,527, filed Jul. 31, 2020, which is a continuation of PCT/EP2019/052544, filed Feb. 1, 2019, which claims priority to EP 18 155 002.1, filed Feb. 2, 2018, the entire disclosures of which are hereby incorporated herein by reference in their entireties.

BACKGROUND

The present disclosure refers to a method for controlling distribution of a product in a computer network and a system.

Chain-of-custody may refer to the chronological electronic documentation trail that records the sequence of custody, control, and transfer of a product or product item.

WO 2017/027648 A1 refers to a system for tracking and recording the chain-of-custody for assets within a supply chain that creates a non-repudiatable electronic log of each custody transfer at each transfer point from initial creation, to final transfer or disposal. The system uses encryption technology to register assets that are to be transferred and whose chain of custody is to be ensured. Through use of encryption key pairs and blockchain encryption technology, an electronic document is created in an encrypted transaction log updated at each change of custody point. At each such change of custody point, the new custodians who receive the product are provided with the information generated by the originator.

WO 2016/138447 A1 discloses a system for tracking end-to-end provenance of labeled goods despite re-unitization, repackaging, or transformation of the goods. The system comprises cryptographic codes including a first cryptographic code and a second cryptographic code. Each cryptographic code can include a private key to serve as a label and a public key that serves to identify a cryptographic address in a distributed consensus network. The system can track a source item by publishing a first cryptographically verifiable record that associates an original stock keeping unit and an original quantity with a first cryptographic address associated with the first cryptographic code. The system can re-unitize the source item by publishing, to the distributed consensus network, a second cryptographically verifiable record that indicates the first cryptographically verifiable record as a source and associates a new stock keeping unit and a new quantity with a second cryptographic address associated with the second cryptographic code.

SUMMARY

This disclosure provides an improved method and system for controlling distribution of a product in a computer network.

According to an aspect, a method for controlling distribution of a product in a computer network is provided, the method comprising providing a computer network having a plurality of processing devices each comprising one or more processors and a storage. Keys for asymmetric cryptography are provided in the computer network, comprising: providing a pair of product keys, the pair of product keys assigned to a product to be distributed and comprising a private product key and a public product key; and providing a pair of manufacturer keys, the pair of manufacturer keys assigned to a manufacturer and comprising a private manufacturer key and a public manufacturer key. In a first data processing device assigned to the manufacturer in the computer network, the method is further comprising: generating a matrix code by encoding first electronic information comprising the private product key; providing the public product key, the public manufacturer key, and the private manufacturer key; generating a first transaction assigned to the product, a first transaction content of the first transaction comprising the public product key, and the public manufacturer key, and signing the first transaction with both the private product key and the private manufacturer key. Imprinting data are provided for imprinting an imprint of the matrix code on the product.

According to another aspect, a system is provided, comprising a computer network having a plurality of processing devices each comprising one or more processors and a storage; and data processing instructions. The data processing instructions are provided by one or more software applications running in the computer network and are to be processed by the one or more processors provided in the plurality of data processing devices for controlling a chain-of-custody for a product in the computer network. The data processing instructions are configured for providing keys for asymmetric cryptography in the computer network, comprising: providing a pair of product keys, the pair of product keys assigned to a product to be distributed and comprising a private product key and a public product key; and providing a pair of manufacturer keys, the pair of manufacturer keys assigned to a manufacturer and comprising a private manufacturer key and a public manufacturer key. Further, the data processing instructions are configured for, in a first data processing device assigned to the manufacturer in the computer network: generating a matrix code by encoding first electronic information comprising the private product key; providing the public product key, the public manufacturer key, and the private manufacturer key; generating a first transaction assigned to the product, a first transaction content of the first transaction comprising the public product key, and the public manufacturer key; and signing the first transaction with both the private product key and the private manufacturer key. The data processing instructions are configured for providing imprint data for imprinting an imprint of the matrix code on the product.

The product is distributed to a customer, such distributing may comprises providing the product through the first distributor or through the first distributor and at least one additional (second) distributor to the customer.

By the method and the system, a chain-of-custody for distribution of the product can be controlled.

The imprint may be provided, for example, on at least one of a product packaging and a package insert. The imprint may comprise a QR code (abbreviated from Quick Response Code) and/or some other type of matrix barcode (or two-dimensional barcode). A barcode is a machine-readable optical label that contains information encoded. A QR code consists of black squares arranged in a square grid on a white background, which can be read by an imaging device such as a camera, and processed using Reed-Solomon error correction until the image can be appropriately interpreted. The required data is then extracted from patterns that are present in both horizontal and vertical components of the image.

The imprinting data are configured to be provided or outputted to a printing device for imprinting the imprint of the matrix code.

The method may further comprise providing a pair of first distributor keys, the pair of first distributor keys assigned to a first distributor and comprising a first private distributor key and a first public distributor key; and providing the first transaction content further comprising the first public distributor key.

The method may further comprise providing a pair of second distributor keys, the pair of distributor keys assigned to a second distributor in the computer network and comprising a second private distributor key and a second public distributor key; and scanning the imprint on the product by a first scan device connected to a second data processing device assigned to the first distributor. In the second data processing device, the following may be provided: providing the private product key by decoding the matrix code scanned; providing the public product key, the first public distributor key, and the second public distributor key; generating a second transaction assigned to the product, a second transaction content of the second transaction comprising the public product key, the first public distributor key, and the second public distributor key; and signing the second transaction with both the private product key and the first private distributor key.

The method may further comprise scanning the imprint by a second scan device connected to a third data processing device assigned to the second distributor, and, in the third data processing device, the following may be provided: providing the private product key by decoding the matrix code scanned; providing the public product key, the second public distributor key, and a customer code indicating that the product is to be distributed to a customer; generating a third transaction assigned to the product, a third transaction content of the third transaction comprising the public product key, the second public distributor key, and the customer code; and signing the third transaction with both the private product key and the second private distributor key.

The method may further comprise scanning the imprint on the product by the first scan device connected to the second data processing device assigned to the first distributor in the computer network. In the second data processing device, the method may further comprise the following: providing the private product key by decoding the matrix code scanned; providing the public product key, and the customer code indicating that the product is to be distributed to the customer; generating a fourth transaction assigned to the product, a fourth transaction content of the fourth transaction comprising the public product key, the first public distributor key, and the customer code; and signing the fourth transaction with both the private product key and the first private distributor key. Signing each of the first to the fourth transaction with both the private product key and the private key of a distribution instance allows for securely controlling the distribution of different products in different distribution chains comprising different distribution instances. In particular, key verification of both product and distribution instance can take place at each distribution stage.

The method may further comprise scanning the imprint on the product by a third scan device connected to a fourth data processing device assigned to the customer in the computer network; and, in the fourth data processing device, providing the private product key by decoding the matrix code scanned. Since the same product key pair is employed throughout the distribution of the product and the corresponding transaction signing via the respective data processing devices, a constrained data overhead is provided.

The method may further comprise, in the fourth data processing device assigned to the customer: receiving a customer request for generating a fifth transaction assigned to the product; verifying whether the customer is assigned authority for generating product related transaction; if the customer is assigned authority, generating the fifth transaction; and if the customer is not assigned authority, preventing generation of the fifth transaction in response to the customer request.

The method may further comprise, in the fourth data processing device, determining from the customer code whether the customer is authorized to generate the product related transaction, the customer code indicating one of a customer authority and a customer non-authority for generating the product related transaction. Accordingly, the customer code may be generated indicating customer authority and a customer non-authority for the customer.

The generating of the fifth transaction may further comprise, in the fourth data processing device, generating the fifth transaction for the product with a customer identification, the customer identification identifying the customer. The customer identification may be a private or personal identification for the customer. The customer identification may be registered before generating the fifth transaction. There may be a step of verifying whether the customer registration has been registered prior to generating the fifth transaction in the fourth data processing device. In case registration cannot be verified, in the fourth data processing device, in response to the customer request, generating the fifth transaction may be prevented.

The method may further comprise, in the providing of the pair of product keys, providing a pair of product recall keys, the pair of product recall keys assigned to a product recall and comprising a private product recall key and a public product recall key. In the first data processing device the following may be provided: generating a recall transaction assigned to the product, a recall transaction content of the recall transaction comprising the public product recall key and indicating a recall request for the product; and signing the recall transaction with the private product recall key and the private manufacturer key. In addition, scanning the imprint on the product by the second scan device connected to the fourth data processing device may be provided. In addition, in the fourth data processing device assigned to the customer, the following may be provided: providing the public product recall key by decrypting the matrix code scanned; receiving the recall transaction; decrypting the recall transaction by applying the public product recall key; generating recall status output data indicating the recall request; and notifying the customer of the recall request by outputting the output data through an output device of the fourth data processing device.

The method may further comprise providing a blockchain topology in the computer network, the blockchain topology comprising: a plurality of data blocks; each of the plurality of data blocks provided in a blockchain of one or more data blockchains; and in the one or more blockchains, a subsequent data block comprising a hash value of a previous data block to be followed by the subsequent data block in the blockchain. The data processing devices of the computer network may be provided with a copy of each the one or more blockchains or only a subset of the blockchains. In the one or more blockchains, at least one transaction from the following group may be stored: the first transaction, the second transaction, the third transaction, the fourth transaction, and the fifth transaction.

The one or more blockchains each may be provided with a data super-block. In the context of the present disclosure, a super-block of a blockchain refers to a distinguished data block of the blockchain comprising information about the blockchain and/or the other data blocks of the blockchain. It may be provided that write access to a super-block of a blockchain is restricted to certain entities or authorities which are, e.g., in charge of administering the blockchain.

The super-block of the blockchain may comprise information about entities with write access for (non-super-block) data blocks. If the blockchain is a meta-blockchain, the super-block may also comprise information about the sub-blockchains of the meta-blockchain. The super-block of the blockchain may, e.g., specify authorities administering the sub-blockchains.

The alternative embodiments described above with regard to the method for controlling a chain-of-custody for a product in a computer network may also apply to the system mutatis mutandis.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
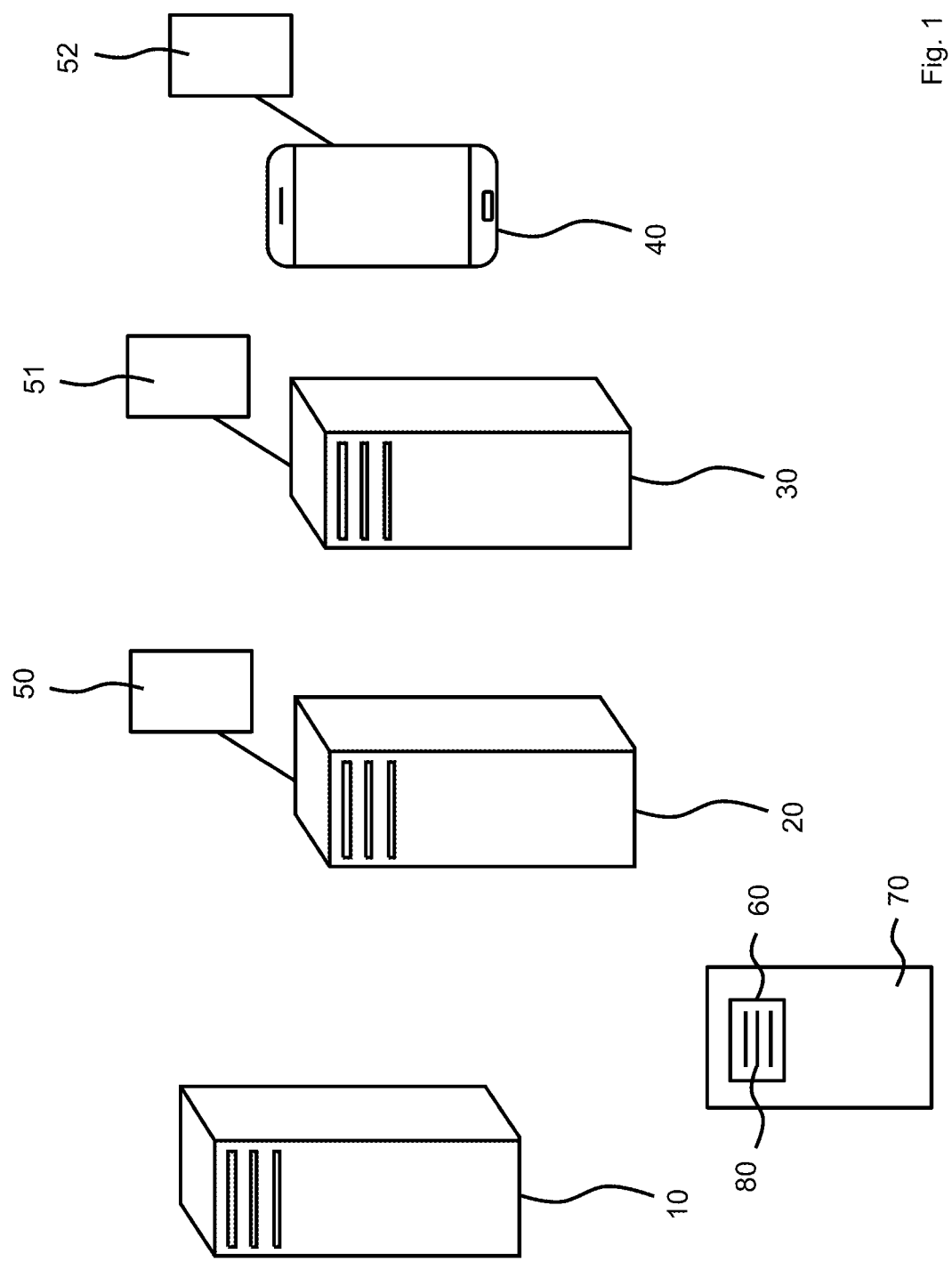
FIG. 1 is a schematic representation of a computer network provided with a plurality of data processing devices each having one or more processors and a storage.

FIG. 1 shows a schematic representation of a computer network provided with a plurality of data processing devices each having one or more processors and a storage. The plurality of data processing devices comprises a first data processing device 10 assigned to a manufacturer, a second data processing device 20 assigned to a first distributor, (optionally) a third data processing device 30 assigned to a second distributor, and a fourth data processing device 40 assigned to a customer. The fourth data processing device 40, for example, may be provided as a portable device such as a laptop computer or a mobile phone. The plurality of data processing devices is configured to exchange electronic data.

Some of the data processing devices from the plurality of data processing devices, namely, the second data processing device 20, the third data processing device 30, and the fourth data processing device 40, each have assigned or connected one of scan devices 50, 51, 52 configured to scan an imprint 60 provided on a product 70 such as a medical product. The scan devices 50, 51, 52 may be provided with an optical scanner known as such with different device design. The product 70 is to be distributed through at least one of the first distributor and the second distributor to the customer owning the fourth data processing device 40. The imprint 60 is provided, for example, with a matrix code 80 such as a two-dimensional code, for example, QR code or barcode.

In the computer network an infrastructure for asymmetric cryptography is provided. A plurality of pairs of keys each comprising a private key and a public key is provided in the computer network. In an embodiment, the plurality of keys comprises the following: A pair of product keys comprising a public product key (Pub-PIK) and a private product key (Priv-PIK); a pair of manufacturer keys comprising a public manufacturer key (Pub-MK) and a private manufacturer key (Priv-MK); a pair of first distributor keys comprising a private first distributor key (Priv-DK1) and a public first distributor key (Pub-DK1); and a pair of second distributor keys comprising a private second distributor key (Priv-DK2) and a public second distributor key (Pub-DK2). In this embodiment, the second distributor may be a pharmacy distributing the product 70 to customers.

In the process of distributing the product 70 from the manufacturer to the customer, a method for controlling a chain-of-custody for the product 70 in the computer network is applied. In the first data processing device 10, the method comprises generating the matrix code 80 by encoding first electronic information comprising the private product key (Priv-PIK); providing the public product key (Pub-PIK), the public manufacturer key (Pub-MK), and the private manufacturer key (Priv-MK). A first transaction assigned to the product 70 is generated in the first data processing device 10, a first transaction content of the first transaction comprising the public product key (Pub-PIK), and the public manufacturer key (Pub-MK). The first transaction is electronically signed with the private product key (Priv-PIK) and the private manufacturer key (Priv-MK) in the first data processing device 10. Imprinting data are provided for imprinting (also referred to herein as "printing") the imprint 60 with the matrix code 80 (also referred to herein as "the printed matrix code"), and the imprint 60 is provided on the product 70.

After the product 60 has been distributed to the first distributor, the imprint 60 on the product 70 is scanned by the scan device 50 connected to the second data processing device 20 assigned to the first distributor. In the second data processing device 20, the private product key (Priv-PIK) is provided by decoding the matrix code 80 scanned. Further, in the second data processing device 20 the public product key (Pub-PIK), the first public distributor key (Pub-DK1), and the second public distributor key (Pub-DK2) are provided. A second transaction assigned to the product 70 is generated in the second data processing device 20, a second transaction content of the second transaction comprising the public product key (Pub-PIK), the first public distributor key (Pub-DK1), and the second public distributor key (Pub-DK2). The second transaction is electronically signed with the private product key (Priv-PIK) and the first private distributor key (Priv-DK) in the second data processing device 20.

After distributing the product 70 to the second distributor such as a pharmacy, the imprint 60 is scanned by the scan device 51 connected to the third data processing device 30 assigned to the second distributor. In the third data processing device 30, the private product key (Priv-PIK) is provided by decoding the matrix code 80 of the imprint 60. In an embodiment, the public product key (Pub-PIK), the second public distributor key (Pub-DK Pharmacy), and a customer code are provided in the third data processing device 30. The customer code is indicating that the product 70 is to be distributed to the customer. According to an embodiment, the customer code may comprise the following information: Label product as sold to end customer (0x00). It allows customer to create a final transaction that adds a private identification (ID) which was previously registered with a vendor of the respective product, i.e., customer ID of a MySugar user. In an alternative embodiment, the customer code may comprise the following information: Identity of an end customer.

A third transaction assigned to the product 70 is generated in the third data processing device 30, a third transaction content of the third transaction comprising the public product key (Pub-PIK), the second public distributor key (Pub-DK2), and the customer code. The third transaction is electronically signed with the private product key (Priv-PIK) and the second private distributor key (Priv-DK2) in the third data processing device 30.

In an alternative embodiment, the product may be distributed from the first distributor to the customer directly, not through the second distributor.

In such embodiment, after distributing the product 70 to the first distributor, the imprint 60 on the product 70 is scanned by the scan device 50 connected to the second data processing device 20. In the second data processing device 20, the private product key (Priv-PIK) is provided by decoding the matrix code 80. The public product key (Pub-PIK), and the customer code are provided in the second data processing device 20. A fourth transaction assigned to the product 70 is generated in the second data processing device 20, a fourth transaction content of the fourth transaction comprising the public product key (Pub-PIK), the first public distributor key (Pub-DK), and the customer code. The fourth transaction is electronically signed with the private product key (Priv-PIK) and the first private distributor key (Priv-DK) in the second data processing device 20.

Further, after the product has been distributed to the customer, the imprint 70 on the product 60 is scanned by the scan device 52 connected to the fourth data processing device 40 assigned to the customer in the computer network. In the fourth data processing device 40 the private product key (Priv-PIK) is provided by decoding the matrix code 80 scanned.

The Use of the Product

The method may further comprise, in the fourth data processing device 40, receiving a customer request for generating a fifth transaction assigned to the product 70. In the fourth data processing device 40, it is verified whether the customer is assigned authority for generating a product related transaction in the computer network. For example, for verification of the customer's authority it may be checked whether the customer has been registered before in a central register provided in the computer network. In an embodiment, one of the following may be checked for verification: customer number, a pair of keys for asymmetric cryptography assigned to the customer.

In an alternative embodiment, it may not be verified whether the customer is assigned authority for generating a product related transaction in the computer network. In such case the customer may add fifth transaction assigned to the product 70 by using the Priv-PIK only.

If the customer is verified to have been assigned authority, the fifth transaction is generated in the fourth data processing device 40 assigned to the customer. If the customer is not assigned authority, generation of the fifth transaction is prevented in response to the customer request in the fourth data processing device 40. Thereby, unauthorized customers or other persons are prevented from generating a product related transaction in the computer network.

It may be checked whether the product has been registered before (see also FIG. 9), such as registration in the blockchain topology.

In the fourth data processing device 40, in the course of determining whether the customer is assigned authority it may be determined from the customer code whether the customer is authorized to generate electronic data indicating the product related transaction in the computer network. In such embodiment, the customer code indicates one of a customer authority and a customer non-authority for generating the product related transaction. Accordingly, the customer code is generated indicating customer authority and a customer non-authority for the customer.

The generating of the fifth transaction may further comprise, in the fourth data processing device 4, generating the fifth transaction for the product 70 with a customer identification, the customer identification identifying the customer, for example, by customer information such as at least one of name, address, email address, or anonymously. The customer identification may be a private or personal identification for the customer. The customer identification may be registered before generating the fifth transaction. There may be a step of verifying whether the customer registration has been registered prior to generating the fifth transaction in the fourth data processing device 40. Such verification may be conducted by one of the data processing devices authorized to act as miner, for example, in case customer key information is integrated into the blockchain topology. In case registration cannot be verified, in the fourth data processing device 40, in response to the customer request, generating the fifth transaction may be prevented.

In an embodiment, the method may further comprise, in the step providing of the pair of product keys, providing a pair of product recall keys, the pair of product recall keys assigned to a product recall and comprising a private product recall key (Priv-RK) and a public product recall key (Pub-RK) for cryptography. In the first data processing device 10, the following may be provided: generating a recall transaction assigned to the product 70, a recall transaction content of the recall transaction comprising the public product recall key (Pub-RK) and indicating a recall request for the product 70. The recall transaction is electronically signed with the private product recall key (Priv-RK) and the private manufacturer key (Priv-MK) in the first data processing device 10. In such embodiment, the imprint 60 on the product 70 is scanned by the scan device 52 connected to the fourth data processing device 40. Further, in the fourth data processing device 40 assigned to the customer, the following is provided: providing the public product recall key (Pub-RK) by decrypting the matrix code 80 scanned; receiving the recall transaction; decrypting the recall transaction by applying the public product recall key (Pub-RK); generating recall status output data indicating the recall request; and notifying the customer of the recall request by outputting the output data through an output device of the fourth data processing device 40, the output display, for example, provided with a display.

The method may comprise providing a blockchain topology in the computer network. By the blockchain topology an electronic ledger may be implemented. In general, in the computer network a blockchain is a continuously growing list of electronic data records, called (data) blocks, which are linked and secured using cryptography. Each block may contain a hash pointer as a link to a previous block, a timestamp and transaction data (content of transaction) indicative of a transaction. By design, blockchains are inherently resistant to modification of the data.

In the computer network provided with the plurality of data processing devices, the blockchain topology is provided with a plurality of data blocks, each of the plurality of data blocks provided in a blockchain of one or more data blockchains. In the one or more blockchains, a subsequent data block comprises a hash value of a previous data block to be followed by the subsequent data block in the blockchain. The data processing devices of the computer network may be provided with a copy of each the one or more blockchains or only a subset of the blockchains. In the one or more blockchains, at least one transaction from the following group may be stored: the first transaction, the second transaction, the third transaction, the fourth transaction, and the fifth transaction.

In the blockchain topology of the computer network there is tree structure provided for a plurality of blockchains.

Figure 2:
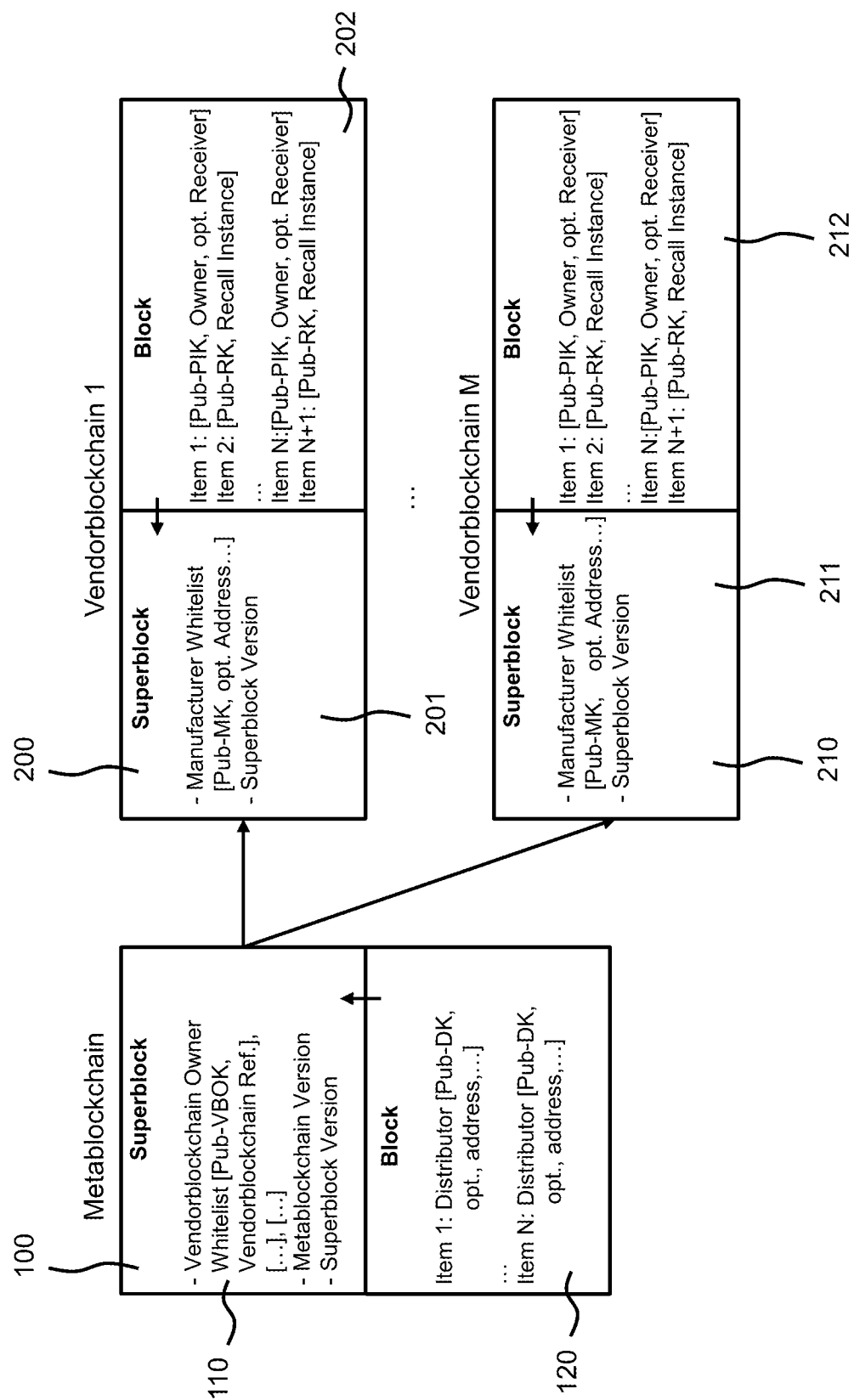
FIG. 2 is a schematic diagram of a blockchain topology.
Figure 3:
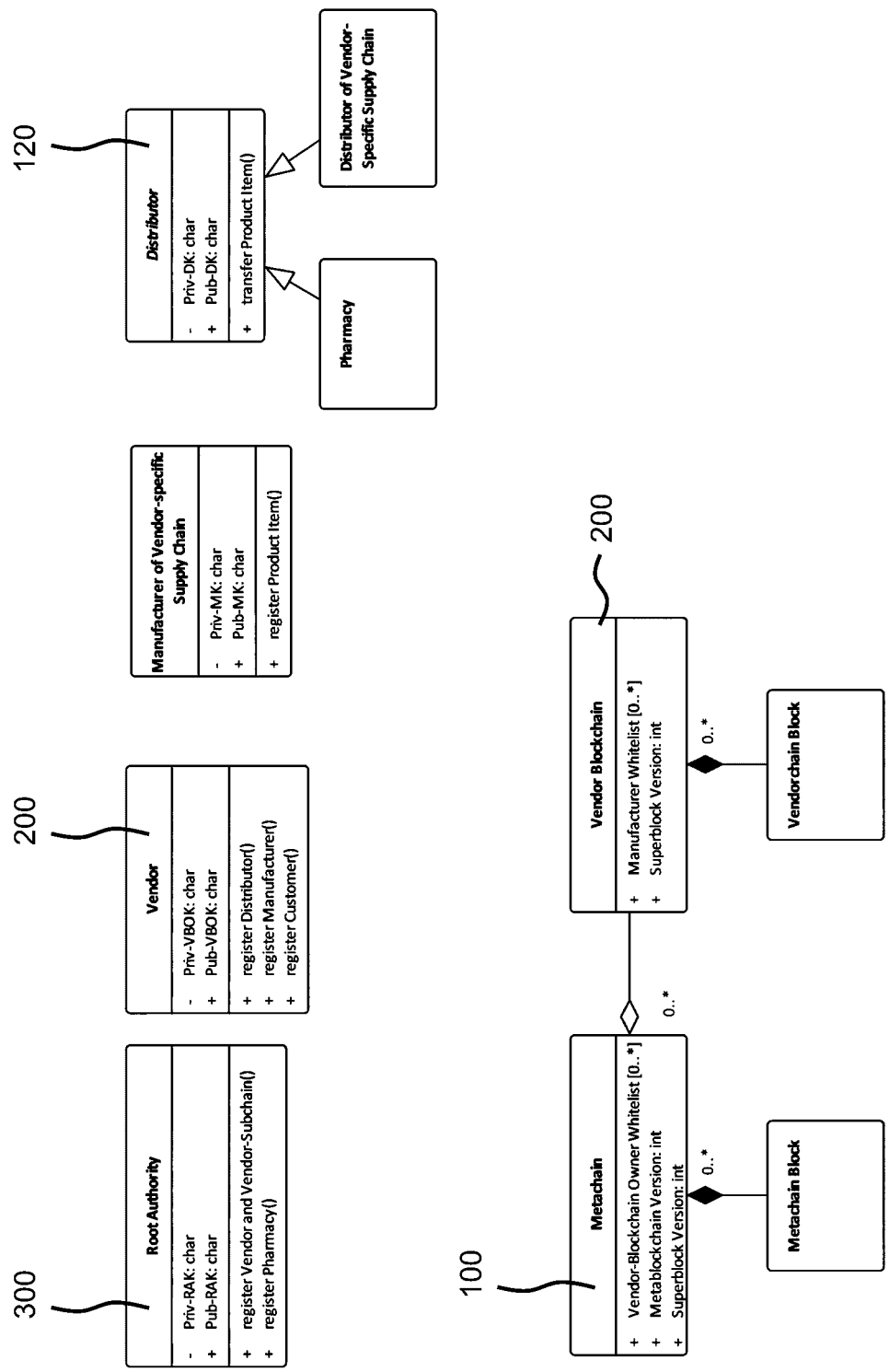
FIG. 3 is a further schematic diagram with regard to the blockchain topology.

The one or more blockchains each may be provided with a data super-block. In the computer network, the blockchain topology provided is schematically shown in FIG. 2 (see also FIG. 3).

For the plurality of blockchains, amendments to the super-block can only be made by an authority. In case an amendment is requested by an unauthorized data processing device, such request is denied. The authorized data processing device may enforce an update.

With regard to the meta-blockchain, the following characteristics are provided. The super-block of the meta-blockchain 100 comprises registration of registrars. Each vendor is a registrar for a vendor-blockchain of the vendor. The super-block of the meta-blockchain 100 provides for "a starting point" of the tree structure. In the blocks of the blockchain, all distributors are contained who are allowed to generate transactions in the vendor-blockchains. In other words, the meta-blockchain comprises information about who is allowed to generate transactions for the vendor-blockchains. Differently, the vendor-blockchain comprises product related transactions, i.e., for products assigned to the vendor.

The meta-blockchain 100 is provided with a super-block 110 and a block 120. A plurality of blocks 0 . . . n may be provided.

There is a plurality of sub-blockchains 200, 210, referred to as vendor-blockchains in FIG. 2. Each of the vendor-blockchains 200, 210 is provided with a super-block 201, 211 and at least one block 202, 212.

Following, further aspects with regard to the process of controlling chain-of-custody within the blockchain topology are provided.

Figure 4:
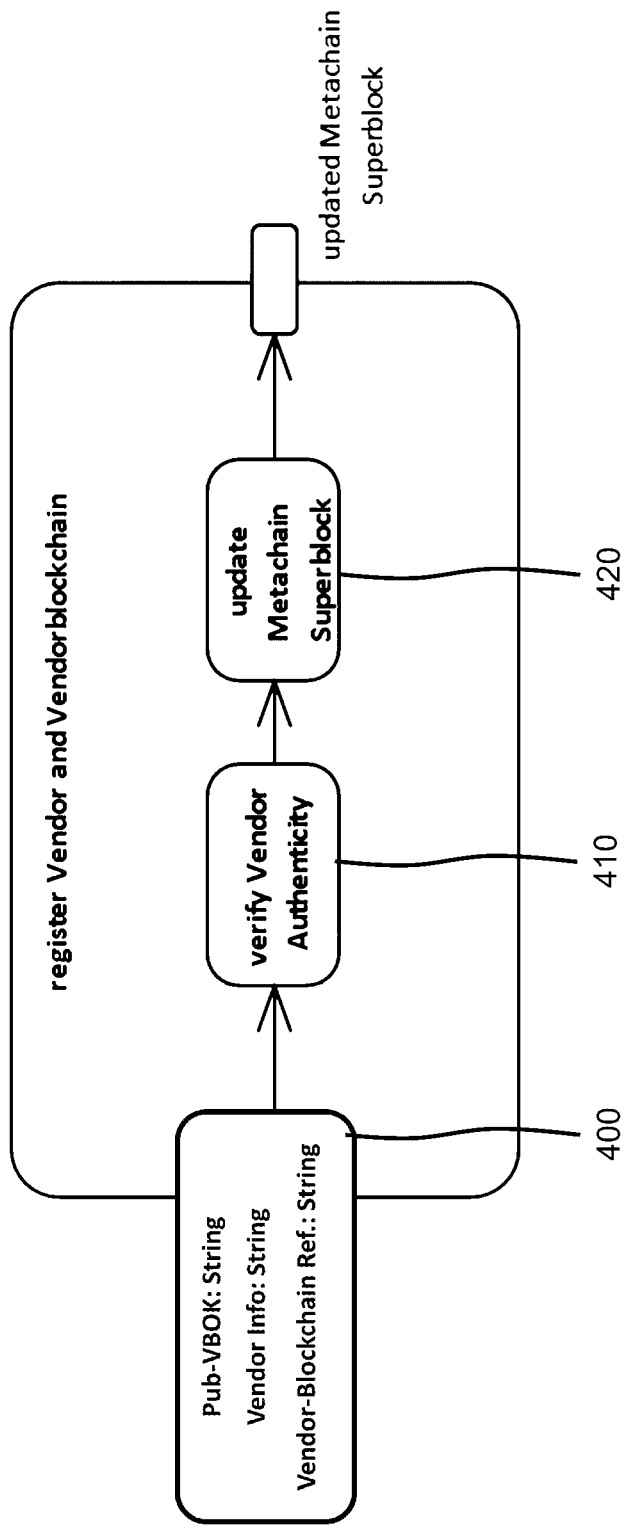
FIG. 4 is a schematic diagram with respect to registration of a vendor and a vendor-blockchain in the blockchain topology.

Referring to FIG. 4 registration of a vendor and a vendor-blockchain are schematically represented. A vendor sends a request to a Root Authority 300 (see FIG. 3) to register a vendor-blockchain. The meta-blockchain 100 (see FIG. 3) is assigned to the Root Authority 300.

The following steps are involved. In a step 400, the vendor provides a public vendor key (Pub-VBOK) of a self-generated asymmetric key comprising the public vendor key (Pub-VBOK) to the Root Authority 300 alongside with additional vendor-related information (such as company name, . . . ) and a reference to a super-block of the vendor-blockchain ("Vendor-blockchain Ref.").

The authenticity of the vendor is verified (step 410).

The Root Authority adds the Pub-VBOK along with the reference to the vendor-blockchain and vendor-specific information to the super-block of the meta-blockchain (step 420). The Root Authority increments the meta-blockchain version number to signal clients that the super-block was updated. The Root Authority signs the super-block of the meta-blockchain with its private key (Priv-RAK). The meta-blockchain super-block now includes the new vendor and a reference to its vendor-blockchain.

Figure 5:
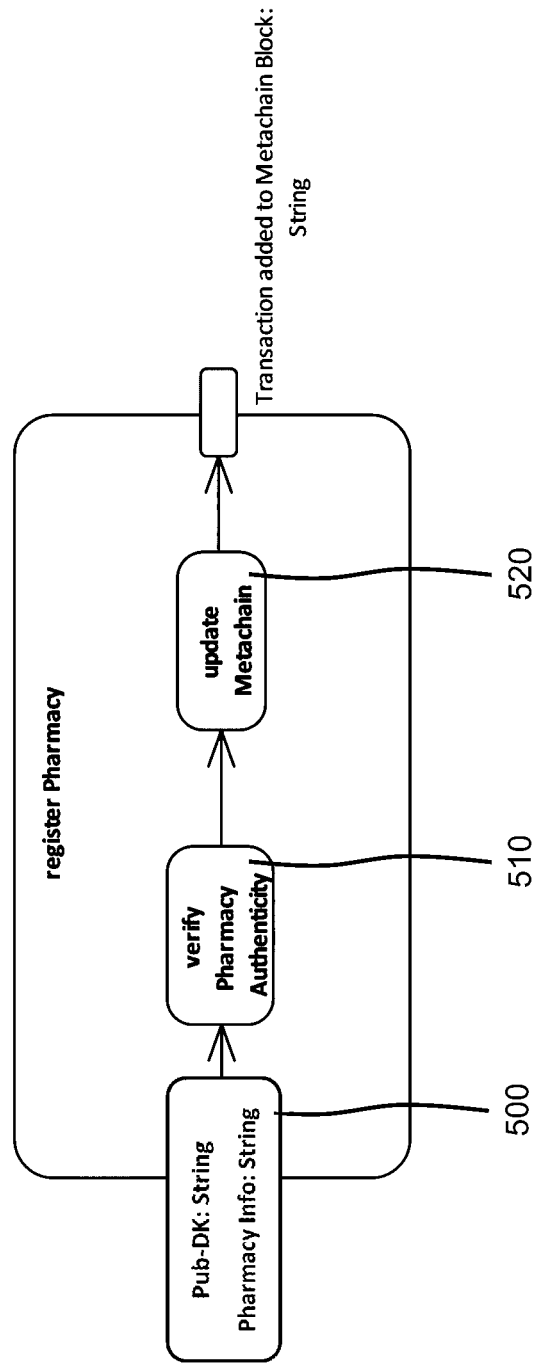
FIG. 5 is a schematic diagram with respect to registration of a distributor.

Referring to FIG. 5, the registration of a distributor (such as a Pharmacy or another distributor) is schematically depicted. The distributor to be registered may be the first or second distributor disclosed above.

In step 500, the distributor (pharmacy) sends a request to the Root Authority to register as a distributor (an alternative option would be to send the request to a registered vendor). The following steps are involved: The pharmacy provides the Pub-DK of a self-generated asymmetric key (Pub-DK, Priv-DK) to the Root Authority along with additional pharmacy-related information (company name, . . . ).

The authenticity of the pharmacy is verified (step 510).

The Root Authority creates a transaction to add the Pub-DK of the pharmacy to the next block of the meta-blockchain (step 520). For distributors being pharmacies the entire information field may be mandatory to allow end users/customers to make a judgement about the identity of a seller. The Root Authority signs the transaction with its private key (Priv-RAK). The Root Authority pushes the transaction to so-called miners provided in the blockchain topology. One or more data processing devices may implement a miner provided with a software application for mining in the computer network. Only a data processing device registered as an authorized instance in the blockchain topology may act as miner. Data processing devices authorized to act as a miner are provided with a copy of all blockchains of the blockchain topology in the computer network. Other data processing devices not authorized to do mining are provided only with a subset of the blockchains of the blockchain topology in the computer network.

Mining conducted by the one or more miners is the process by which transactions are verified and added to an electronic public ledger, the blockchain. The mining process may involve compiling recent transactions into blocks. In addition or alternatively, the mining process may involve trying to solve a computationally difficult puzzle. The miner first solving the puzzle gets to place the next block on the block chain and claim optional rewards.

The meta-blockchain is updated with a new transaction which publishes the pharmacy as a valid distributor. The pharmacy can now create transactions for the product in the vendor-blockchains in the computer network.

Figure 6:
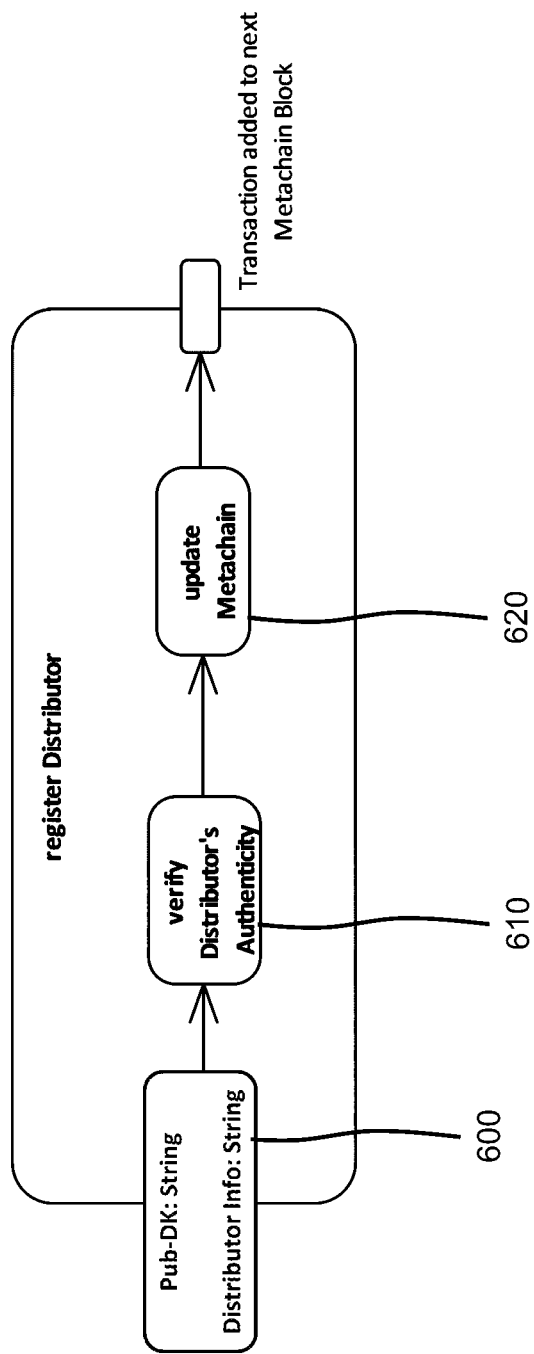
FIG. 6 is a schematic diagram with respect to registration of another distributor.

With respect to FIG. 6, registration of another distributor is schematically represented.

A vendor requests a distributor of its supply chain in the meta-blockchain. The following steps are involved: The vendor obtains the first public distributor key (Pub-DK), i.e., public part of distributor's asymmetric key, and additional information to be added to the meta-blockchain (step 600). For example, name, address and/or data identifying a geo-location for the distributor may be provided. The additional information provided for different distributors may be different with regard to the kind of information provided. The vendor to whom the distributors are registered will decide about what additional information is made public for what distributor.

The authenticity of the distributor is verified (step 610).

The vendor creates a transaction to add the distributor to the next block of the meta-blockchain which is signed with its Priv-VBOK (step 620). The transaction includes the first public distributor key (Pub-DK) of the first distributor as a mandatory field. In the mandatory filed, for example, name, address and/or data identifying a geo-location for the distributor may be provided. The information provided for different distributors may be different with regard to the kind of information provided.

The vendor can select the additional amount of distributor information to be made available in a meta-blockchain transaction. For pharmacies the entire information field may be made mandatory to allow end users/customers to make a judgement about the identity of a seller.

The vendor pushes the transaction to the miners for inclusion in the next block of the meta-blockchain.

The meta-blockchain is updated with a new transaction which publishes the distributor as an authorized distributor in the computer network. The distributor can now create transactions for existing products in the vendor-sub-block.

Figure 7:
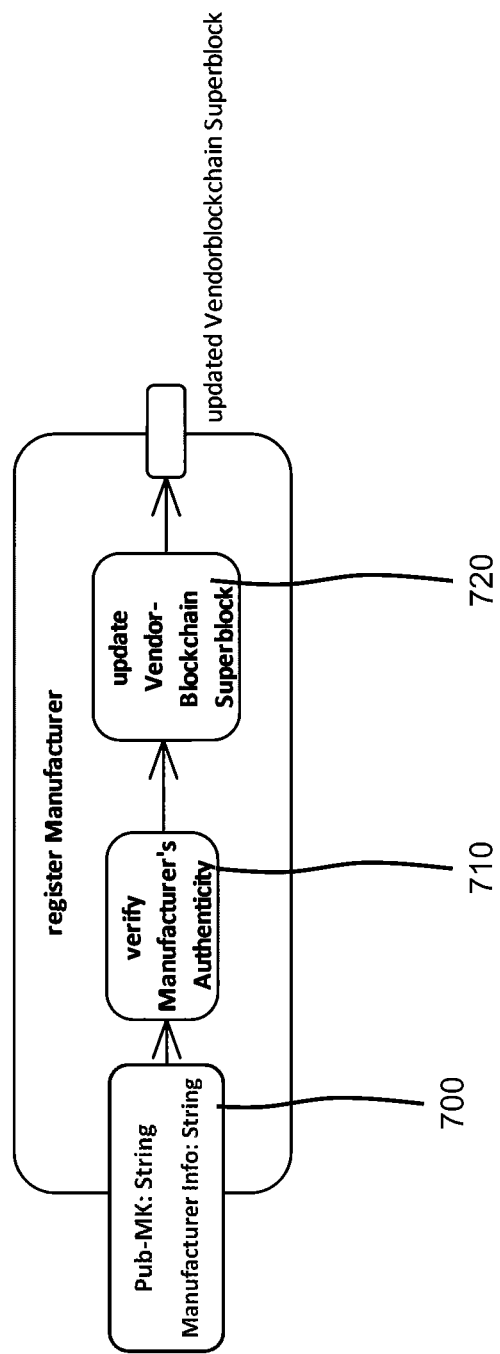
FIG. 7 is a schematic diagram with respect to registration of a manufacturer.

Referring to FIG. 7, registration of a manufacturer in the blockchain topology is depicted.

A vendor registers a manufacturer of its supply chain in its vendor-blockchain. The following steps are involved: The vendor obtains the public manufacturer key (Pub-MK), i.e., public part of manufacturer's asymmetric key, and additional information to be added to the super-block of the vendor-blockchain (step 700). For example, name, address and/or data identifying a geo-location for the manufacturer may be provided. The additional information provided for different manufacturers may be different with regard to the kind of information provided. The vendor to whom the manufacturers are registered will decide about what additional information is made public for what manufacturer.

The authenticity of the manufacturer is verified (step 710).

The vendor adds the public manufacturer key (Pub-MK) along with manufacturer-specified information that the vendor wishes to disclose, to the super-block of the vendor-blockchain (step 720). The vendor increments the super-block version number to signal clients that the super-block in the vendor blockchain was updated. The vendor signs the super-block of the vendor-blockchain with his Priv-VBOK.

The super-block of the vendor-blockchain now includes the new manufacturer. The manufacturer has been registered. The manufacturer is now able to add new products to the vendor-blockchain.

Figure 8:
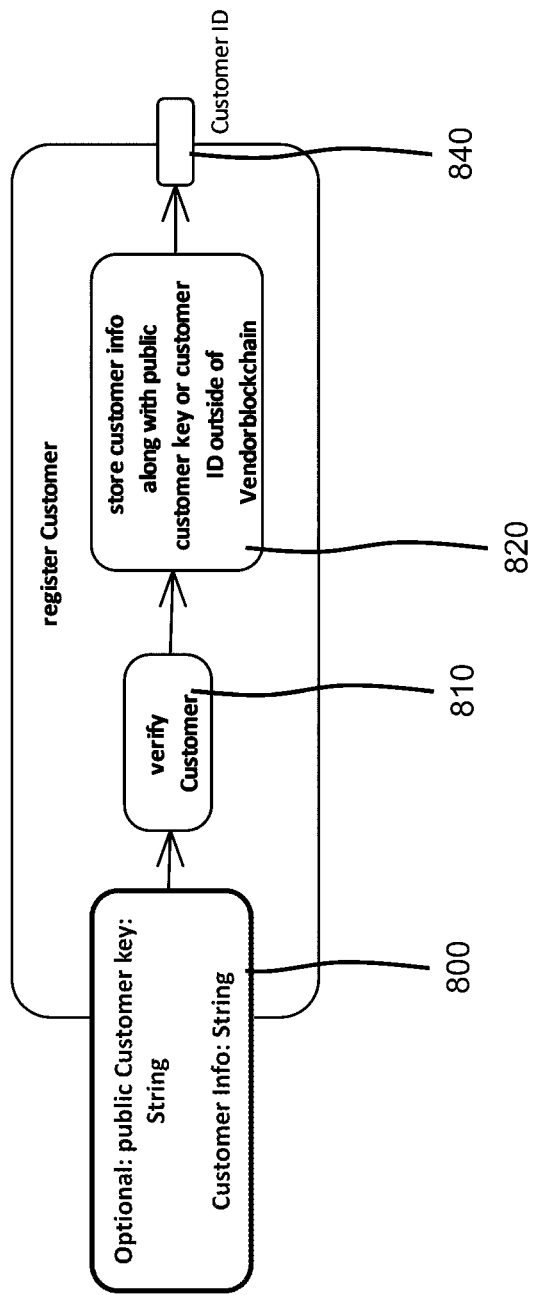
FIG. 8 is a schematic diagram with respect to registration of a customer.

Regarding FIG. 8, registration of a customer in the blockchain topology is depicted.

A customer, through the fourth data processing device 40, sends a request to the vendor to register a customer. The following steps are involved: In the data processing device assigned to the vendor a customer ID is assigned to the customer (800). Alternatively, also cryptographic customer keys can be used to support secure SMART contracts within the vendor-blockchain. The customer ID (or public key) associated with the customer's information is stored in a storage outside of the blockchain topology, in order to not disclose the customer's private information.

In the data processing device assigned to the vendor, the authenticity of the customer is verified (step 810). For verification, for example, personal information assigned to the customer may be verified, such as data about an account of the customer, and/or data about a mobile phone number of the customer.

The customer obtains a customer ID (steps 820 and 840). In an embodiment, without cryptographic customer keys, the customer can label the product 70 with his customer ID to obtain additional services from a vendor which are not implemented with blockchain technology. In an alternative embodiment, with cryptographic customer keys, additional smart contract-based services can be supported between customer and vendor.

Figure 9:
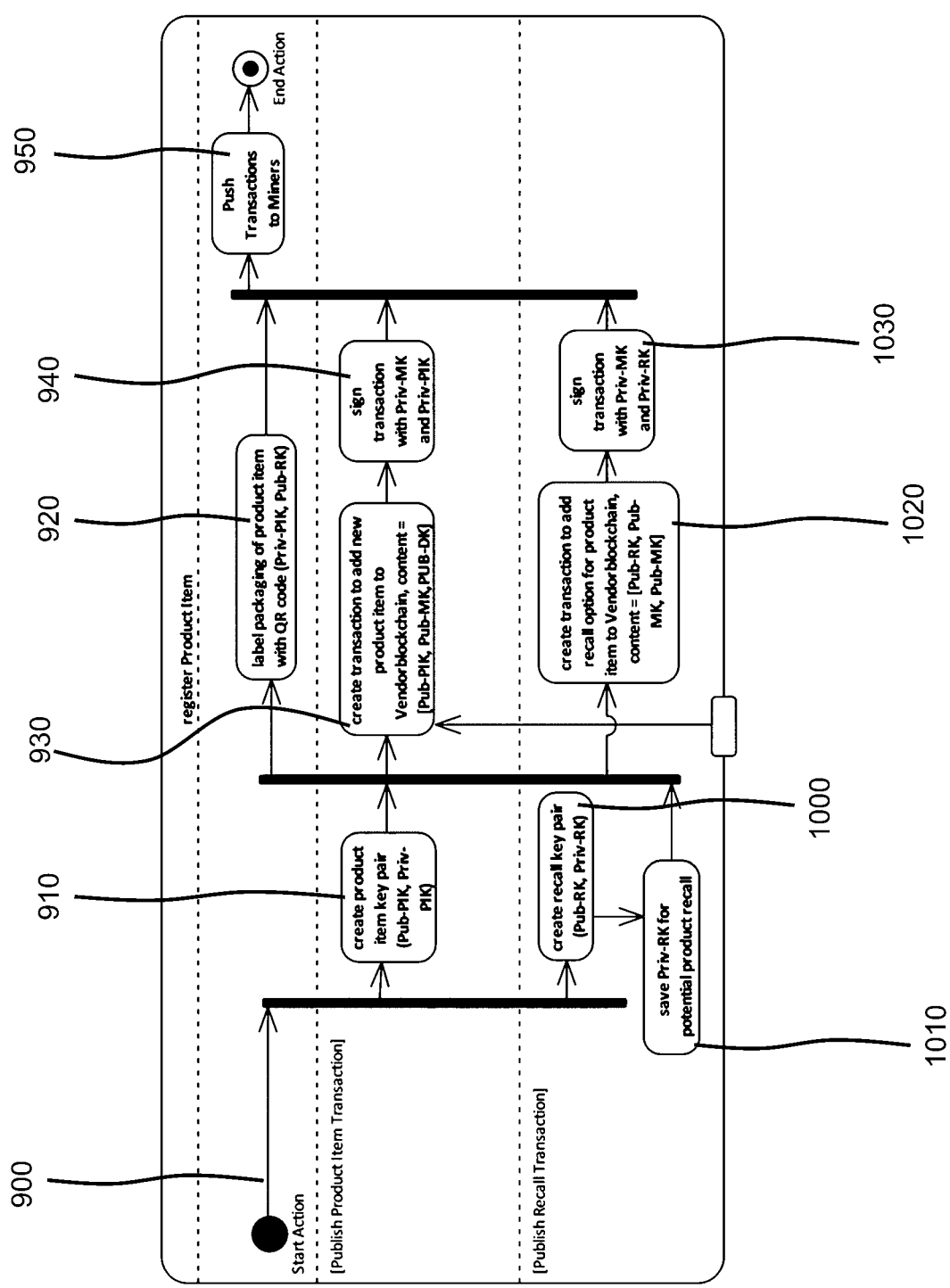
FIG. 9 is a schematic diagram with respect to registration of a product.

Referring to FIG. 9 registration of the product 70 is schematically depicted.

The manufacturer registers the (new) product 70 in a vendor-blockchain in which he has write permissions (step 900), i.e., in which the manufacturer is whitelisted.

Referring to FIG. 9, the following steps are depicted:

Step 900: Initiating a process for registration;

Step 910: Generating a pair of keys for asymmetric cryptography for the product by the manufacturer;

Step 920: Imprinting a QR Code with Priv-PIK and Pub-RK of product and assign to packaging;

Step 930: Creating an initial transaction to add a new product to its respective vendor blockchain;

Step 940: Signing the initial transaction with Priv-MK to allow miners to check for manufacturer's permission to create new products in the vendor-blockchain (is Pub-MK of manufacturer whitelisted) and Priv-PIK to allow miners to check that manufacturer is in ownership of the product to which Pub-PIK belongs;

Step 950: The transactions are submitted to the computer network running the blockchain topology.

Further, steps with regard to a recall action related to the product 70 are depicted in FIG. 9:

Step 1000: Generating a pair of asymmetric keys (Priv-RK, pub-RK) for a recall action of the product by the manufacturer;

Step 1010: Storing the private recall key (Priv-RK) in a data processing device assigned to the manufacturer;

Step 1020: Creating an initial transaction to add a recall action for a new product item to its respective vendor blockchain;

Step 1030: Signing initial transaction with Priv-MK to allow miners to check identity of manufacturer and his permission to create a new product item in the adequate vendor-blockchain (Is Pub-MK of manufacturer whitelisted?), and Priv-RK to allow miners to check that manufacturer is in ownership of the recall action for the product item to which Pub-RK belongs.

For the product 70 multiple transactions can be added to the vendor-blockchain, depending on the functionality provided with the blockchain topology (publish new product item, recall setup, different smart contracts for automatic reordering . . . ).

Two transactions may be provided (see FIG. 9). Firstly, a publish product transaction to publish a new product in the vendor-blockchain. This allows everyone to check if a bought product is a genuine product. Secondly, a publish recall transaction which allows the manufacturer to recall a certain product item in case problems with a certain product item become known.

Both transactions are set up with the following minimum content=
[1. Public key identifying the product 70 (Pub-PIK) or its recall action (Pub-RK),
2. Public key of the manufacturer which is used by miners to verify if the manufacturer has write privileges to the vendor-blockchain and to establish chain-of-custody,
3. Public key of a distributor (Pub-DK1)/new owner to which the product 70 will be shipped or who will be able to execute a recall in case of a recall transaction. Only the (first or second) distributor which the here defined key (pair of asymmetric keys of the here given public distributor key (Pub-DK)) will be able to add a new transaction for the public key identifying this product 70 (Pub-PIK) or recall action, given he also has access to the respective private keys (Priv-DK, Priv-PIK). The attribute is also required to establish the chain-of-custody.]

Additional content attributes may be provided, like a reference to a vendor-blockchain to which the item shall be added. However, the here given description shall only explain the general concept of securing transactions. The additional content attributes, for example, may refer to information with respect to the product, e.g., a link to a website presenting the product, date of production of the product, and/or date of the product's expiry.

Both transactions are finally signed by the manufacturer with
the private manufacturer key (Priv-MK), and
(This allows miners to check if the manufacturer is the one it presents itself as in the blockchain topology. The transaction will be accepted if the manufacturer is also whitelisted as an authorized manufacturer for the respective vendor-blockchain.)
the product-specific respective Priv-PIK/Priv-RK.
(With this signature of the last transaction for the respective product key, miners can verify that the product is owned by the entity submitting the transaction.)

Figure 10:
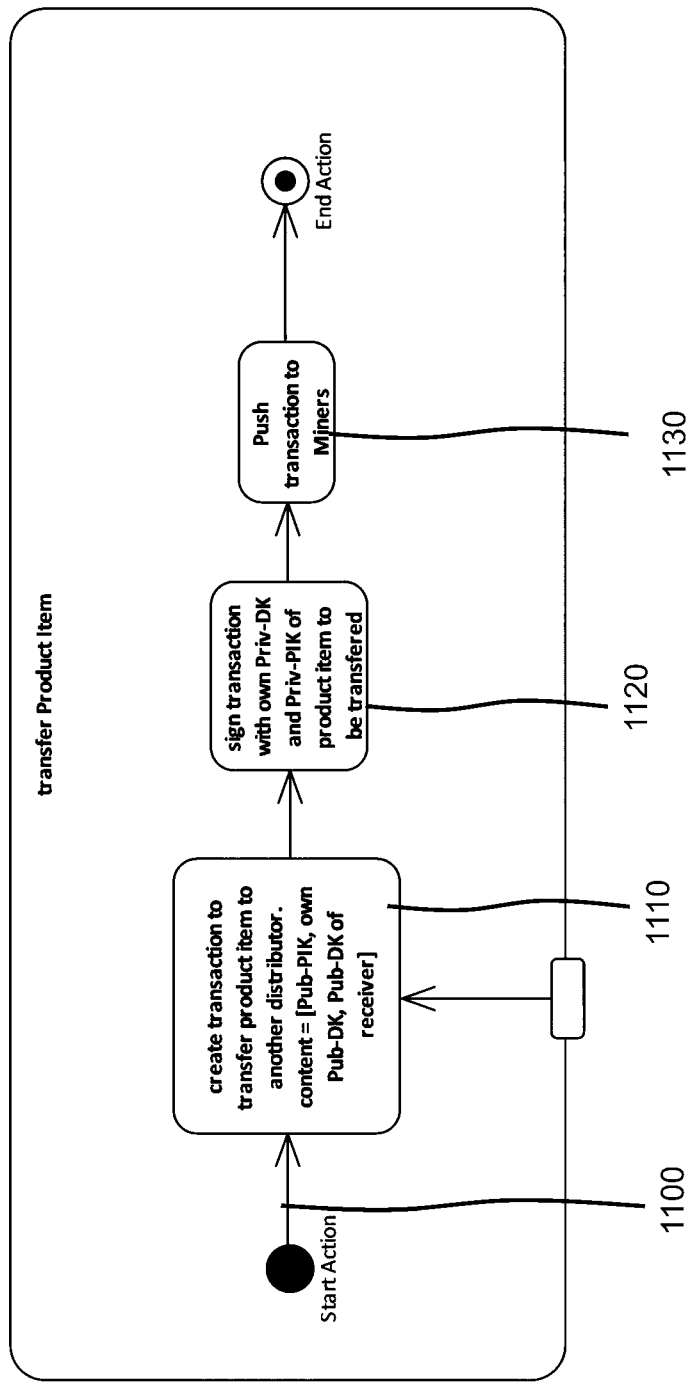
FIG. 10 is a schematic diagram with respect to transfer of a product in the course of distribution of the product.

Referring to FIG. 10 distribution (transfer) of the product 70 is schematically depicted.

After starting action in step 1100, the product 70 is transferred from the first distributor (distributor A) assigned the second data processing device 20 to second distributor (distributor B) assigned the third data processing device 30 by creating a transaction for the product (item) 70 with the Pub-DK of distributor B as receiver (step 1110). The transaction, with regard to a minimum required content, for maintaining chain-of-custody content may comprise: Pub-PIK to identify relevant product 70; Pub-DK of distributor A, which is used by miners to verify if distributor A is current owner of the relevant product item in the relevant blockchain, and to establish chain-of-custody; and Pub-DK of distributor B to which the product item shall be transferred.

Only the distributor with the here defined key will be able to add a new transaction for the Pub-PIK identifying the product 70, given it also has access to the respective Priv-PIK of the product 70. Attribution is also required to maintain the chain-of-custody.

Additional content information may be required (by means of attributes or special characteristics of public keys), like a reference to the relevant vendor-blockchain to which the transaction shall be added.

The transaction is signed with Priv-DK (step 1120), for miners to be able to verify that the sender of the transaction is really the owner of Pub-DK distributor A according to the transaction. Also sign with Priv-PIK of product item for miners to verify that distributor A is also the physical owner of the product item.

In step 1130, the transaction is pushed to the data processing devices acting as miners in the computer network.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A system for controlling recall of a product in a computer network, comprising:
a computer network having at least first and second data processing devices each having a processor and storage;
a pair of product keys assigned to the product including a private product key and a public product key;
a pair of product recall keys assigned to a product recall, including a private product recall key and a public product recall key, wherein the pair of product recall keys is separate and distinct from the pair of product keys;
wherein the first data processing device assigned to a manufacturer in the computer network is configured to:
(a) print a matrix code on the product comprising the private product key;
(b) generate a recall transaction assigned to the product including the public product recall key and indicating a recall request for the product; and
(c) sign the recall transaction with the private product recall key and a private manufacturer key;
wherein the second data processing device is configured to scan the printed matrix code on the product by a scan device and provide the public product recall key by decrypting the printed matrix code.

2. The system of claim 1, wherein the second data processing device is assigned to a distributor.

3. The system of claim 1, wherein the second data processing device is assigned to a customer.

4. The system of claim 3, wherein the second data processing device is further configured to:
(a) receive the recall transaction;
(b) decrypt the recall transaction by applying the public product recall key;
(c) generate recall status output data indicating the recall request; and
(d) notify the customer of the recall request through an output device of the second data processing device.

5. The system of claim 1, further comprising:
a blockchain topology in the computer network that includes a plurality of data blocks;
each of the plurality of data blocks provided in a blockchain of one or more data blockchains; and
in the one or more blockchains, a subsequent data block comprising a copy of a previous data block to be followed by the subsequent data block in the blockchain, and a hash value of the previous data block;
wherein a copy of the one or more blockchains is provided to each data processing device; and
the one or more blockchains comprising at least one transaction from the following group: a first transaction, a second transaction, a third transaction, a fourth transaction, and a fifth transaction.

6. The system of claim 5, wherein the one or more blockchains comprises a data super-block comprising access information about the respective blockchain.

7. A method for controlling recall of a product in a computer network, comprising:
providing a pair of product keys assigned to the product including a private product key and a public product key;
providing a pair of product recall keys assigned to a product recall, including a private product recall key and a public product recall key, wherein the pair of product recall keys is separate and distinct from the pair of product keys;
in a first data processing device:
(a) generating a recall transaction assigned to the product including the public product recall key and indicating a recall request for the product; and
(b) signing the recall transaction with the private product recall key and a private manufacturer key; and
scanning a printed matrix code on the product by a third scan device connected to a fourth data processing device; and
in the fourth data processing device that is assigned to a customer,
(c) providing the public product recall key by decrypting the printed matrix code.

8. The method of claim 7, further comprising providing a computer network having a plurality of processing devices each having a processor and storage.

9. The method of claim 8, further comprising providing a pair of product keys assigned to the product including a private product key and a public product key.

10. The method of claim 9, wherein the first data processing device is assigned to a manufacturer in the computer network.

11. The method of claim 10, further comprising, before step a), on the first data processing device printing a matrix code on the product comprising the private product key.

12. The method of claim 8, further comprising:
providing a blockchain topology in the computer network that includes a plurality of data blocks;
each of the plurality of data blocks provided in a blockchain of one or more data blockchains; and
in the one or more blockchains, a subsequent data block comprising a copy of a previous data block to be followed by the subsequent data block in the blockchain, and a hash value of the previous data block;
wherein a copy of the one or more blockchains is provided to each data processing device; and
in the one or more blockchains, storing at least one transaction from the following group:
a first transaction, a second transaction, a third transaction, a fourth transaction, and a fifth transaction.

13. The method of claim 12, further comprising providing the one or more blockchains each with a data super-block comprising access information about the respective blockchain.

14. A system for controlling recall of a product in a computer network, comprising:
a computer network having at least first and second data processing devices each having a processor and storage;
a pair of product keys assigned to the product including a private product key and a public product key;
a pair of product recall keys assigned to a product recall, including a private product recall key and a public product recall key;
wherein the first data processing device assigned to a manufacturer in the computer network is configured to:
(a) print a matrix code on the product comprising the private product key;
(b) generate a recall transaction assigned to the product including the public product recall key and indicating a recall request for the product; and
(c) sign the recall transaction with the private product recall key and a private manufacturer key;
wherein the second data processing device assigned to a customer in the computer network is configured to scan the printed matrix code on the product by a scan device and provide the public product recall key by decrypting the printed matrix code;
wherein the second data processing device is further configured to:
(d) receive the recall transaction;
(e) decrypt the recall transaction by applying the public product recall key;
(f) generate recall status output data indicating the recall request.

15. The system of claim 14, wherein the pair of product recall keys is separate and distinct from the pair of product keys.

16. The system of claim 14, wherein the second data processing device is further configured to:
(g) notify the customer of the recall request through an output device of the second data processing device.

17. The system of claim 14, further comprising:
a blockchain topology in the computer network that includes a plurality of data blocks;
each of the plurality of data blocks provided in a blockchain of one or more data blockchains; and
in the one or more blockchains, a subsequent data block comprising a copy of a previous data block to be followed by the subsequent data block in the blockchain, and a hash value of the previous data block;
wherein a copy of the one or more blockchains is provided to each data processing device; and
the one or more blockchains comprising at least one transaction from the following group: a first transaction, a second transaction, a third transaction, a fourth transaction, and a fifth transaction.

18. The system of claim 17, wherein the one or more blockchains comprises a data super-block comprising access information about the respective blockchain.

* * * * *